(12) United States Patent
Suzuki et al.

(10) Patent No.: US 8,820,989 B2
(45) Date of Patent: Sep. 2, 2014

(54) FIXING STRUCTURE OF INDOOR LAMP

(75) Inventors: Hiroyuki Suzuki, Shizuoka (JP); Shinji Yamada, Kanagawa (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/880,874

(22) PCT Filed: Jan. 11, 2012

(86) PCT No.: PCT/JP2012/051007
§ 371 (c)(1),
(2), (4) Date: Apr. 22, 2013

(87) PCT Pub. No.: WO2012/096408
PCT Pub. Date: Jul. 19, 2012

(65) Prior Publication Data
US 2013/0279189 A1 Oct. 24, 2013

(30) Foreign Application Priority Data
Jan. 13, 2011 (JP) ................................. 2011-005051

(51) Int. Cl.
*B60Q 3/02* (2006.01)
(52) U.S. Cl.
CPC .................................... *B60Q 3/0203* (2013.01)
USPC ......................................... 362/490; 362/549
(58) Field of Classification Search
CPC ..................................................... B60Q 3/0203
USPC .......................... 362/471, 479, 488, 490, 549
See application file for complete search history.

(56) References Cited

U.S. PATENT DOCUMENTS

| | | | |
|---|---|---|---|
| 2002/0166932 A1* | 11/2002 | Sawayanagi et al. | ...... 248/224.8 |
| 2008/0198607 A1 | 8/2008 | Goto | |
| 2009/0073707 A1 | 3/2009 | Nagai et al. | |
| 2009/0206580 A1 | 8/2009 | Torii | |
| 2010/0080014 A1 | 4/2010 | Ichikawa | |

FOREIGN PATENT DOCUMENTS

| | | |
|---|---|---|
| JP | 2000-103282 A | 4/2000 |
| JP | 2009-143531 A | 7/2009 |
| WO | 2008/032159 A1 | 3/2008 |

OTHER PUBLICATIONS

International Search Report and Written Opinion of the International Search Report for PCT/JP2012/051007 dated May 8, 2012.

* cited by examiner

*Primary Examiner* — David V Bruce
(74) *Attorney, Agent, or Firm* — Kenealy Vaidya LLP (57) ABSTRACT

A fixing structure of an indoor lamp includes a lamp unit and an interior wall member. The lamp unit includes a design part arranged at an indoor side of the interior wall member and a functional part arranged at an outdoor side of the interior wall member and assembled with the design part through a lamp attachment hole in a state that the functional part holds the interior wall member therebetween. The functional part has a connector portion for connecting a connector. The design part has a regulating portion which forms a connector insertion portion together with the connector portion when the design part is assembled with the functional part. The regulating portion engages with the connector inserted into the connector insertion portion to regulate displacement of the design part in a disengagement direction from the functional part.

3 Claims, 6 Drawing Sheets

FIG.7

FIXING STRUCTURE OF INDOOR LAMP

TECHNICAL FIELD

The present invention relates to a fixing structure of an indoor lamp for attaching a lamp unit to a lamp attachment hole of an interior wall member.

BACKGROUND ART

In the related art, as a fixing structure of an indoor lamp that attaches a lamp unit, such as a room lamp, to an interior wall member, such as a roof trim, there is known a indoor lighting device (lamp unit) for vehicle (for example, refer to PTL 1) that is fixed in a state where a design part provided on the indoor side through an attachment hole of the ceiling plate (interior wall member) is assembled to a functional part provided on the outdoor side to hold a ceiling plate.

In the fixing structure of such an indoor lighting device for vehicle, when the design part and the functional part are assembled to each other, a locked portion of an elastically deformable manipulation plate provided on the functional part is locked to a locking claw that is provided at a lateral plate of the design part and protrudes laterally. Further, the release of the locked portion from the locking claw is prevented by a spacer that abuts a face opposite to the face of the manipulation plate that faces the lateral plate.

Thus, for example, even in a case where a strong impact is applied to the lamp unit when a curtain air bag or the like is operated, it is possible to prevent unexpected deflection of the manipulation plate, and it is possible to prevent the decoupled design part from falling off and scattering in the vehicle interior.

CITATION LIST

Patent Literature

[PTL 1] JP-A-2009-143531

SUMMARY OF INVENTION

Technical Problem

However, in the case of the fixing structure of the indoor lamp in which the coupling strength between the design part and the functional part is enhanced using the spacer as described above, and the attachment strength of the lamp unit to the interior wall member is improved, there are problems in that the spacer that is a component separate from the design part and the functional part may be required, and a cost increase and a decrease in assembly operation efficiency that accompany an increase in the number of parts may be caused.

The invention has been accomplished in view of the above-described circumstances, and an object thereof is to provide a fixing structure of an indoor lamp that can improve the attachment strength of a lamp unit to an interior wall member without increasing the number of parts.

Solution to Problem

In order to achieve the aforementioned object, a fixing structure of an interior lamp related to the invention is characterized by the following (1) to (3).

(1) A fixing structure of an indoor lamp, comprising:
an interior wall member of a vehicle having a lamp attachment hole; and
a lamp unit attached to the lamp attachment hole;
wherein the lamp unit includes:
a design part arranged at an indoor side of the interior wall member; and
a functional part arranged at an outdoor side of the interior wall member, and assembled with the design part through the lamp attachment hole in a state that the functional part holds the interior wall member therebetween;
wherein the functional part has a connector portion for connecting a connector connected to a wiring;
wherein the design part has a regulating portion which forms a connector insertion portion together with the connector portion when the design part is assembled with the functional part; and
wherein the regulating portion engages with the connector inserted into the connector insertion portion to regulate displacement of the design part in a disengagement direction from the functional part.

(2) The fixing structure of the indoor lamp with the configuration of the above (1), wherein the regulating portion is formed in a frame shape which surrounds an outer peripheral portion of the connector to be inserted into the connector insertion portion.

(3) The fixing structure of the indoor lamp with the configuration of the above (1), wherein the regulating portion has a locking portion which is operable to lock to an engaging lock portion provided on an outer peripheral portion of the connector.

In the fixing structure of the indoor lamp with the configuration of the above (1), the regulating portion provided at the design part engages with the connector inserted into the connector insertion portion, whereby it is possible to regulate displacement of the design part in the disengagement direction from the functional part.

Thus, even in a case where a strong impact is received, it is possible to prevent the design part disengaged from the functional part from falling off and scattering in the vehicle interior.

Additionally, unlike the fixing structure using a spacer of the related art, a cost increase and a decrease in assembly operation efficiency that accompany an increase in the number of parts are not caused.

In the fixing structure of the indoor lamp with the configuration of the above (2), the regulating portion provided at the design part has a frame shape, whereby it is possible to firmly regulate displacement of the design part in the disengagement direction from the functional part while providing a simple shape that is easy to form.

In the fixing structure of the indoor lamp with the configuration of the above (3), the regulating portion provided at the design part has the locking portion that locks the engaging lock portion provided at the outer peripheral portion of the connector and locks the connector in the connector insertion portion. Thus, the structure of the connector portion provided at the functional part can be simplified.

Advantageous Effects of Invention

According to the invention, it is possible to provide the fixing structure of the indoor lamp that can improve the attachment strength of the lamp unit to the interior wall member without increasing the number of parts.

In the above, the invention has been briefly described. Moreover, the details of the invention will be further clarified by thoroughly reading the Description of Embodiments to be described below, with reference to the attached drawings.

BRIEF DESCRIPTION OF DRAWINGS

FIGS. 3A and 3B are exploded sectional views showing a state where a functional part of the lamp unit shown in FIG. 1 is attached to the interior wall member, FIG. 3A is a longitudinal sectional view, and FIG. 3B is a view as seen in the direction of an arrow B-B in the longitudinal sectional view of FIG. 3A.

FIGS. 4A and 4B are exploded sectional views showing a state where the functional part and design part of the lamp unit shown in FIGS. 3A and 3B are assembled to each other, FIG. 4A is a longitudinal sectional view, and FIG. 4B is a view as seen in the direction of an arrow D-D in the longitudinal sectional view of FIG. 4A.

DESCRIPTION OF EMBODIMENTS

A fixing structure of an indoor lamp related to one embodiment of the invention will be described below in detail with reference to the accompanying drawings.

Figure 1:
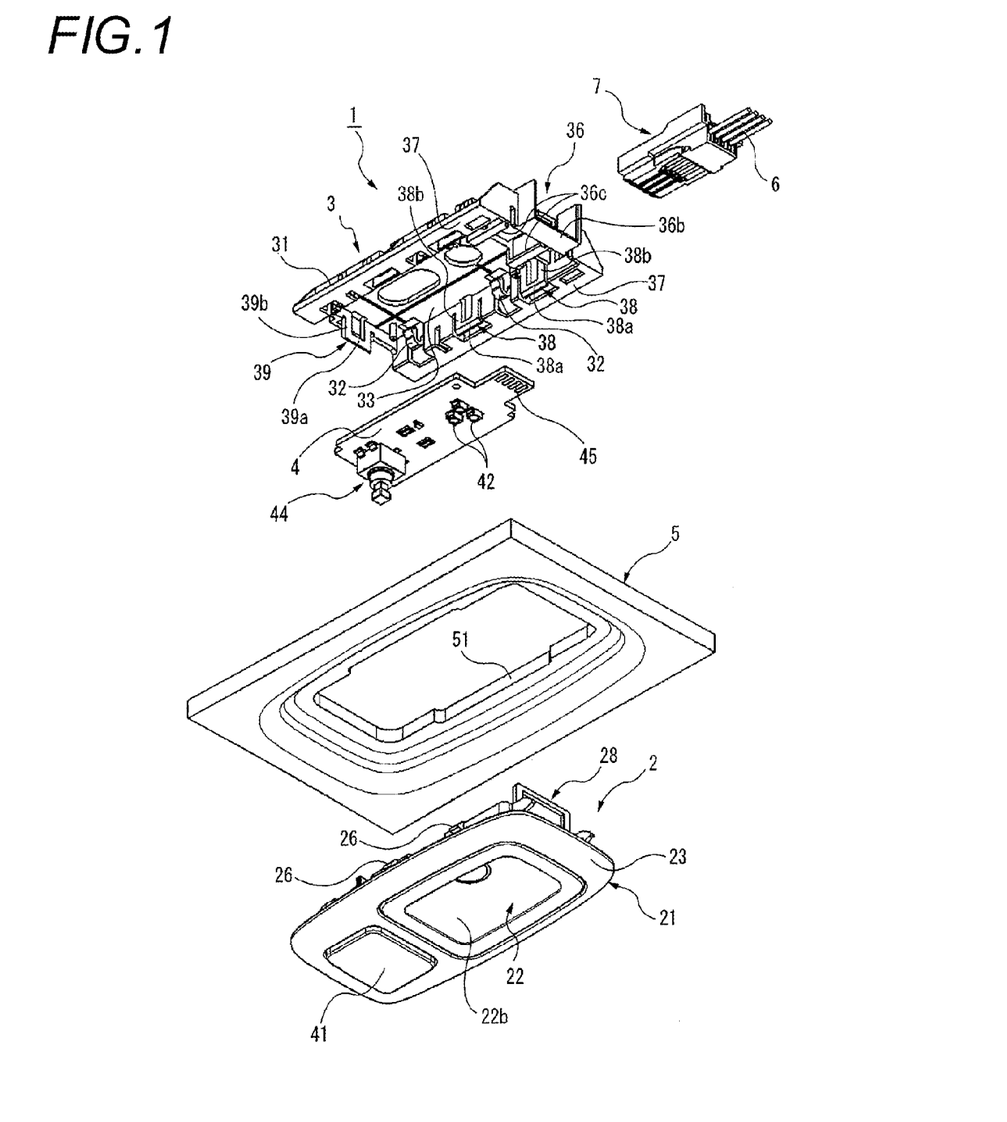
FIG. 1 is an exploded perspective view of a state where a lamp unit is seen from the indoor side of an interior wall member in order to describe a fixing structure of an indoor lamp related to one embodiment of the invention.
Figure 2:
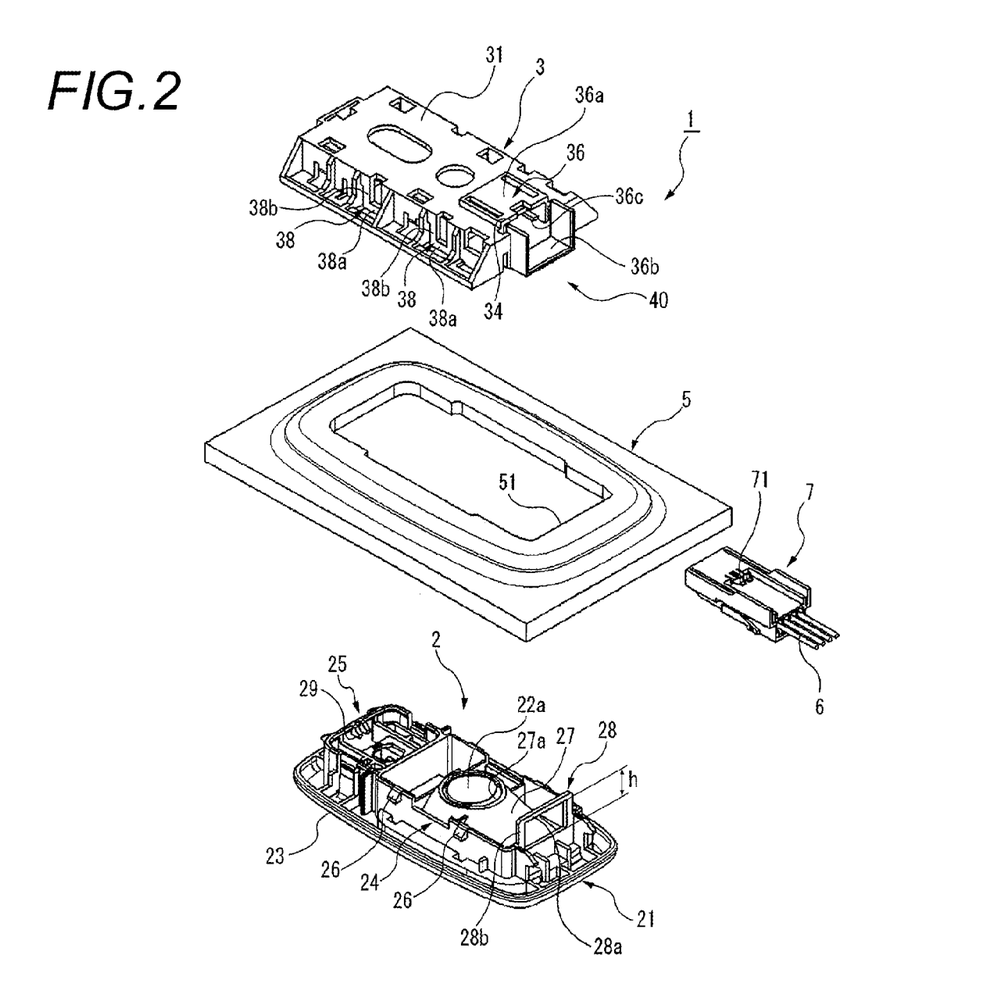
FIG. 2 is an exploded perspective view of a state where the lamp unit is seen from the outdoor side of the interior wall member in order to describe the fixing structure of the indoor lamp related to one embodiment of the invention.

The fixing structure of the indoor lamp related to one embodiment of the invention, as shown in FIGS. 1 and 2, illustrates an example in which a room lamp (lamp unit) 1 is attached to a lamp attachment hole 51 provided in a roof trim (interior wall member) 5 that covers a vehicle body panel (not shown).

The room lamp 1 of this embodiment, as shown in FIGS. 1 to 4B, includes a design part 2 arranged at the indoor side of the roof trim 5, and a functional part 3 arranged at the outdoor side of the roof trim 5 and assembled in a state where the functional part is coupled with the design part 2 through the lamp attachment hole 51 to hold the roof trim 5.

The design part 2 includes a base housing 21 and cover lens 22 having a transparent or translucent. The cover lens 22 is mounted on the lower face of the base housing 21. The base housing 21 includes a rectangular frame plate portion 23 exposed to the indoor side of the vehicle, a protruding portion 24 that is formed along a peripheral edge of a top face of the frame plate portion 23 and rises upward, and a bottom wall portion 27 that covers the top face of the cover lens 22.

A part of the frame plate portion 23 (one longitudinal end in this embodiment) is formed with a switch housing portion 25. The switch housing portion 25 has a switch operating member 41 that can protrude and retract in an up-and-down direction with respect to the frame plate portion 23, a switch 44 of the functional part 3 to be described below is housed in the switch housing portion to allow the pressing operation of the switch 44.

The protruding portion 24 of the base housing 21, as shown in FIG. 2, is a wall portion that protrudes toward the top face of the frame plate portion 23 so as to mostly surround the bottom wall portion 27.

Figure 3A:
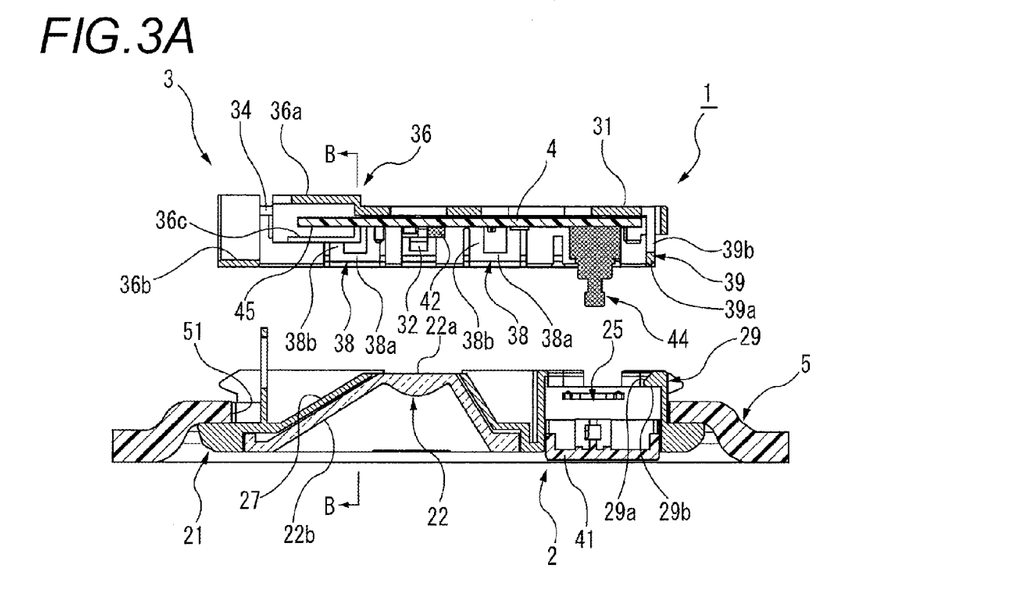
Figure 3B:
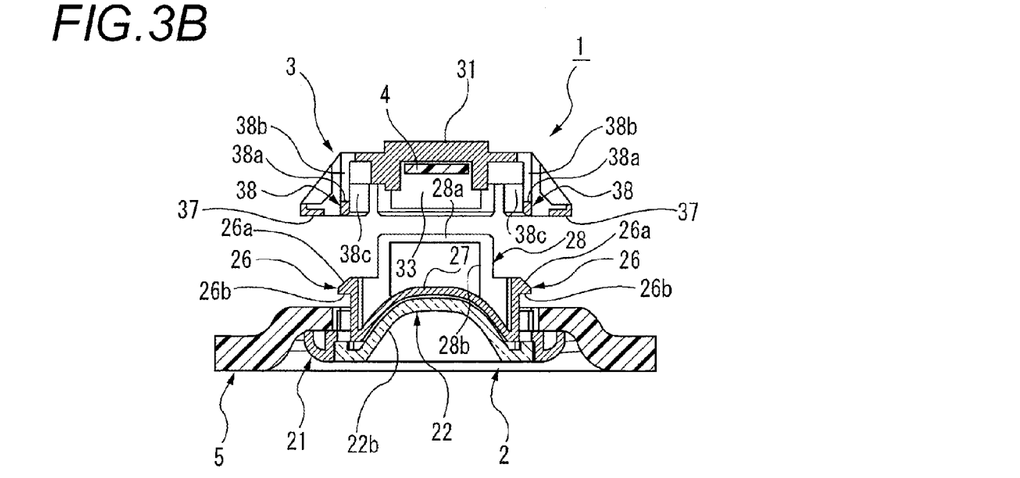

A pair of locking claws 26 is laterally formed on a pair of both side walls (both side walls in a direction orthogonal to the longitudinal direction of the frame plate portion 23 in this embodiment) of the protruding portion 24. As shown in FIG. 3B, in each locking claw 26, a tapered face 26a is formed on the protruding direction side of the protruding portion 24 and a locking face 26b that makes a right angle to a side face of the protruding portion 24 is formed on the side in the opposite direction to the protruding direction.

Additionally, a locking claw 29 is formed inwardly also on a front side wall (side wall of one longitudinal end on the side where the switch housing portion 25 is formed in this embodiment) of the protruding portion 24. As shown in FIG. 3A, in the locking claw 29, a tapered face 29a is formed on the protruding direction side of the protruding portion 24 and a locking face 29b that makes a right angle to a side face of the protruding portion 24 is formed on the side in the opposite direction to the protruding direction.

Moreover, on the rear side (the other longitudinal end side opposite to the switch housing portion 25 in this embodiment) of the protruding portion 24, a connector insertion portion 40 is formed along with a connector portion 36 to be described below when assembled with the functional part 3. A design-part-side connector insertion frame (regulating portion) 28 is provided to regulate displacement of the design part 2 in a disengagement direction from the functional part 3 by engaging with a connector 7 inserted into the connector insertion portion 40.

The design-part-side connector insertion frame 28 is a substantially U-shaped frame made up of a pair of vertical portions 28b that rises from the top face of the frame plate portion 23, and a locking portion 28a laid over the upper ends of the vertical portions 28b.

In addition, the opening height h of the design-part-side connector insertion frame 28 is almost the same dimension as the connector 7 to be inserted into the connector insertion portion 40.

Additionally, the locking portion 28a of the design-part-side connector insertion frame 28 according to this embodiment is used as a locking portion that is lockable to an engaging claw (engaging lock portion) 71 provided on the top face (outer peripheral face) of the connector 7.

The bottom wall portion 27 of the base housing 21, as shown in FIG. 2, is a light-shielding portion that covers the top face of the cover lens 22, has a recessed shape that is downwardly directed in conformity with the shape of a light guide portion of the cover lens 22, and has an opening 27a corresponding to an incidence plane 22a of the cover lens 22.

The functional part 3, as shown in FIG. 1, includes a housing 31 integrally molded from synthetic resin. A board arrangement space 33 that accommodates and holds a circuit board 4 in which a light source 42, a switch 44, and a connection pad 45 are arranged is provided on the lower face of the housing 31. Two pairs of locking pieces 32 that engage with lateral edges of the circuit board 4 to hold the circuit board are provided on both sides of the board arrangement space 33 of the housing 31.

Figure 4A:
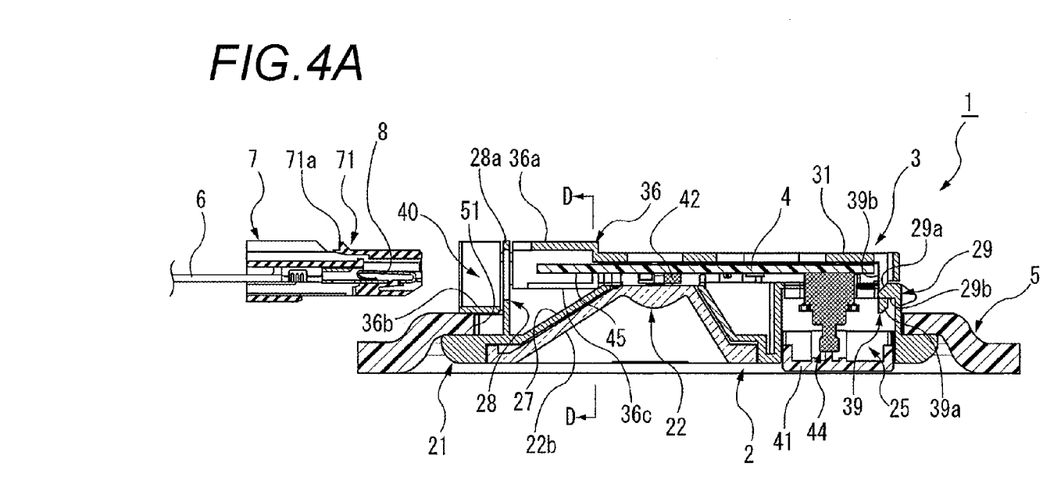
Figure 4B:
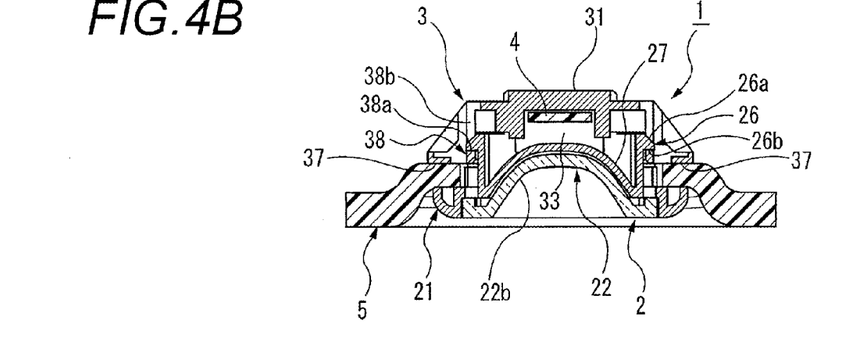

In addition, when the design part 2 and the functional part 3 are assembled together via the roof trim 5, the bottom wall portion 27 faces the board arrangement space 33 so as to cover the board arrange space, and the switch 44 is housed in the switch housing portion 25 so that the operation of the switch 44 becomes possible (refer to FIGS. 4A and 4B).

Pinching plate portions 37 that abut peripheral edge portions on both sides of the attachment hole 51 of the roof trim 5 are formed at bottom faces on both sides of the housing 31. Each pinching plate portion 37 has a length equivalent to the longitudinal length of the attachment hole 51 of the roof trim 5.

Two pairs of locking plates 38 are respectively provided at positions inside the pinching plate portions 37 on both sides of the housing 31. Each locking plate 38 is a substantially U-shaped plate made up of a locked portion 38a laterally laid at a lower portion thereof, and a pair of hanging portions 38b that respectively rises from both ends of the locked portion 38a and has upper ends provided integrally with the housing 31. A protruding portion insertion space 38c that allows the protruding portion 24 of the portion of the design part 2 in which each locking claw 26 is formed to be inserted thereinto is formed inside the locking plate 38. Additionally, the locked portion 38a of the locking plate 38 is arranged at a position corresponding to the locking claw 26 of the design part 2.

Additionally, a locking plate 39 is provided on the front side (right side in FIG. 3A) of the housing 31. The locking plate 39 is a substantially U-shaped plate made up of a locked portion 39a laterally laid at a lower portion thereof, and a pair of hanging portions 39b that respectively rises from both ends of the locked portion 39a and has upper ends provided integrally with the housing 31. Additionally, the locked portion 39a of the locking plate 39 is arranged at a position corresponding to the locking claw 29 of the design part 2.

Additionally, as shown in FIGS. 1 to 4B, a side portion (the other longitudinal end opposite to the switch housing portion 25 in this embodiment) of the functional part 3 is provided with the connector portion 36.

The connector portion 36 has a top wall 36a and a functional-part-side connector insertion frame 36b that are formed integrally with the housing 31. When the design part 2 and the functional part 3 are assembled together, the connector insertion portion 40 is formed along with the design-part-side connector insertion frame 28 formed integrally with the base housing 21 of the design part 2.

The top wall 36a regulates the position of the connector 7 inserted into the connector insertion portion 40 in the up-and-down direction, in cooperation with a pair of guide ribs 36c provided below the top wall 36a. The functional-part-side connector insertion frame 36b with a U-shaped cross-section performs insertion and guiding of the connector 7 inserted into the connector insertion portion 40.

Additionally, as shown in FIG. 3A, a regulating portion insertion space 34 that allows the design-part-side connector insertion frame 28 in the design part 2 to be inserted thereinto is provided between the top wall 36a and the functional-part-side connector insertion frame 36b in the housing 31.

The connection pad 45 of the circuit board 4 to which the light source 42 and the switch 44 are connected protrudes into the connector insertion portion 40. A connector 7 connected to a cable harness 6 arranged on the upper side of the room trim 5 is electrically connected to the connection pad 45 (refer to FIG. 7). In addition, although the example using an LED (Light Emitting Diode) as the light source 42 is shown in this embodiment, it is needless to say that various light sources, such as an electric bulb, can be used.

Next, the procedure of attaching the room lamp 1 according to this embodiment will be described.

First, as shown in FIGS. 1 to 3B, the protruding portion 24 of the design part 2 is inserted from below the lamp attachment hole 51 of the roof trim 5. The functional part 3 is capped from above the lamp attachment hole 51 of the roof trim 5 so as to correspond to the design part 2. As a result, the light source 42 of the functional part 3 faces the incidence plane 22a of the cover lens 22 in the design part 2, and the switch 44 of the functional part 3 is housed in the switch housing portion 25 of the design part 2.

At this time, the protruding portion 24 of the design part 2 is inserted into the protruding portion insertion space 38c inside the locking plate 38 in the functional part 3. When the tapered face 26a of the locking claw 26 provided so as to protrude from the outer face of the protruding portion 24 enters the protruding portion insertion space 38c while elastically deforming the locked portion 38a of the locking plate 38 outwardly, and the locking claw 26 passes through the locked portion 38a, the locked portions 38a return to an original state where the locked portion is not elastically deformed.

Additionally, the protruding portion 24 of the design part 2 is inserted into the outside of the locking plate 39 in the functional part 3. When the tapered face 29a of the locking claw 29 provided so as to protrude from the inner face of the protruding portion 24 advances into the back while elastically deforming the locked portion 39a of the locking plate 39 inward, and the locking claw 29 passes through the locked portion 39a, the locked portion 39a returns to an original state where the locked portion is not elastically deformed.

Moreover, the design-part-side connector insertion frame 28 of the design part 2 is inserted into the regulating portion insertion space 34 of the connector portion 36 in the functional part 3, and the locking portion 28a of the design-part-side connector insertion frame 28 reaches the same height as the top wall 36a of the connector portion 36 to form the connector insertion portion 40.

As shown in FIGS. 4A and 4B, since the locking face 26b of the locking claw 26 abuts the top face of the locked portion 38a, and the locking face 29b of the locking claw 29 abuts the top face of the locking portion 39a, the coupling between the design part 2 and the functional part 3 is not released even if a load is applied in a direction in which the design part 2 and the functional part 3 are disengaged.

Figure 5:
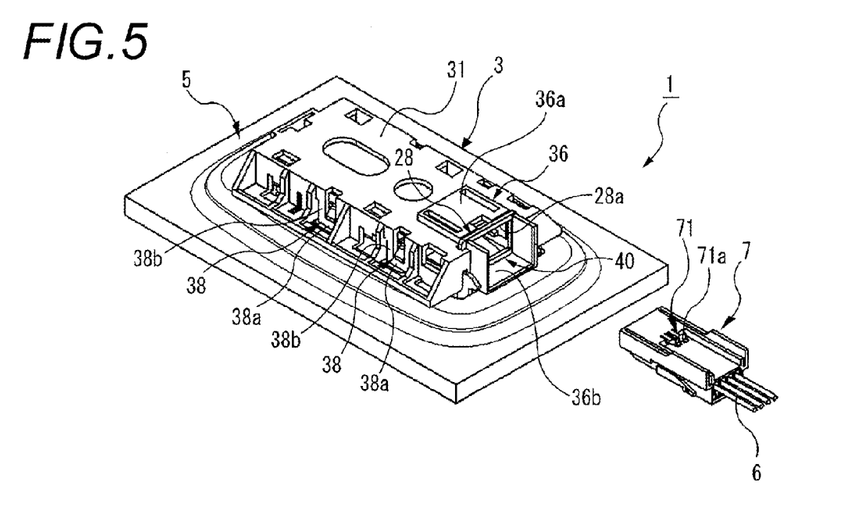
FIG. 5 is a perspective view of a state where the lamp unit shown in FIGS. 4A and 4B is seen from the outdoor side of the interior wall member.

Additionally, as shown in FIG. 5, the connector insertion portion 40 is constituted by the connector portion 36 of the functional part 3 and the design-part-side connector insertion frame 28 of the design part 2 on the rear side of the room lamp 1 attached to the roof trim 5 and arranged on the outdoor side of the roof trim 5.

Next, the connector 7 is inserted into the connector insertion portion 40. When an engaged portion 71a of the engaging claw 71 provided on the top face of the connector 7 advances into the back while being elastically deformed downwardly by the bottom face of the locking portion 28a, and the engaged portion 71a passes through the locking portion 28a, the engaging claw 71 returns to an original state where the engaging claw is not elastically deformed.

Figure 6:
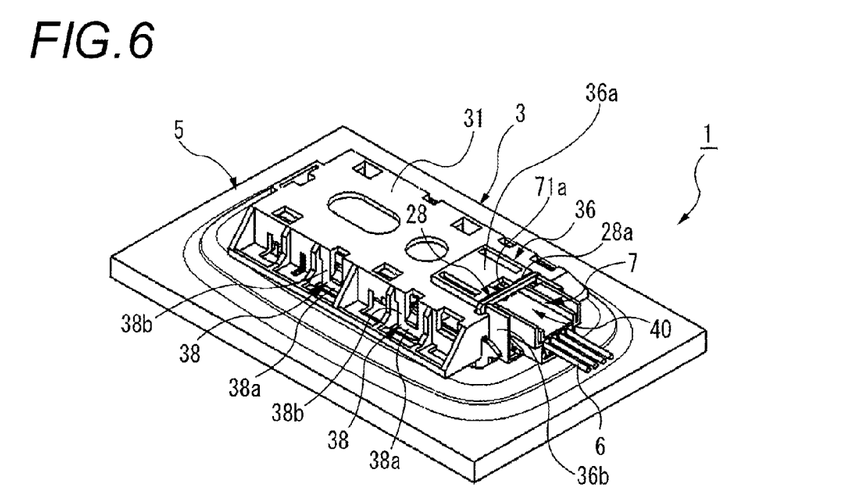
FIG. 6 is a perspective view of a state in which a state where a connector is inserted into a connector insertion portion of the lamp unit is seen from the outdoor side of the interior wall member.
Figure 7:
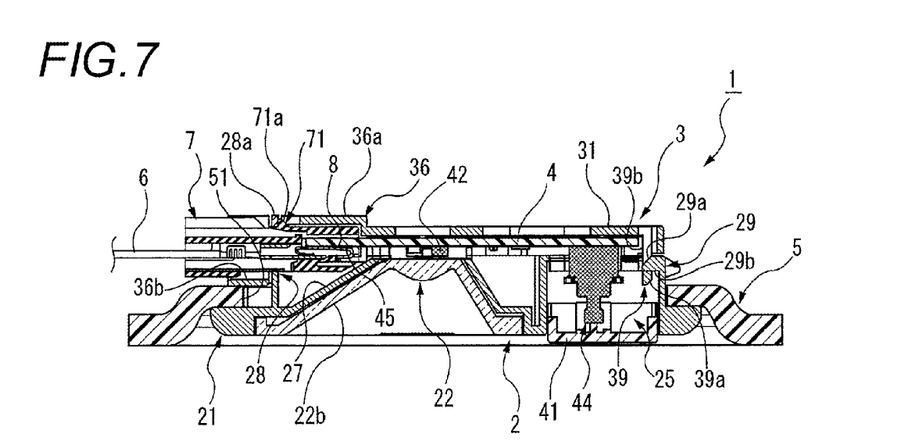
FIG. 7 is a longitudinal sectional view of the lamp unit shown in FIG. 6.

Then, as shown in FIGS. 6 and 7, if the connector 7 inserted into the connector insertion portion 40 arrives at a coupling completion position, the terminal 8 in the connector 7 is connected to the connection pad 45 and the circuit board 4 is electrically connected to the cable harness 6.

At this time, since the engaged portion 71a of the engaging claw 71 is brought into the state of being locked to the locking portion 28a, the connector 7 that has passed through the design-part-side connector insertion frame 28 is not disengaged even if a load is applied in the direction in which the coupling with the connector insertion portion 40 is released.

The attachment of the room lamp 1 to the roof trim 5 is completed in this way.

In the fixing structure of the room lamp 1 related to such this embodiment, the connector 7 that has passed through the design-part-side connector insertion frame 28 provided at the design part 2 and the connector portion 36 provided at the functional part 3 are brought into a latch state by inserting the connector 7 into the connector insertion portion 40.

Thus, as the design-part-side connector insertion frame 28 engages with the connector 7 inserted into the connector insertion portion 40, it is possible to regulate displacement of the design part 2 from the functional part 3 in the disengagement direction.

Accordingly, for example, even in a case where an unexpected load is applied to the room lamp 1 with the operation of a curtain air bag or the like, and the locking claws 26 and 29 that have received a strong impact are undesirably damaged, the connector 7 that has passed through the design-part-side connector insertion frame 28 and the connector portion 36 in a latch state can prevent the design part 2 disengaged from the functional part 3 from falling off and scattering in the vehicle interior.

In the fixing structure of the room lamp 1 according to this embodiment, it is possible to regulate displacement of the design part 2 from the functional part 3 by integrally molding the design-part-side connector insertion frame 28, which forms the connector insertion portion 40 with the connector portion 36, with the design part 2, when being assembled with the functional part 3.

Accordingly, unlike the fixing structure of the related art, the design part and the functional part do not require a space or the like, that is a separate part, and a cost increase and a decrease in assembly operation efficiency that accompany an increase in the number of parts are not caused.

Additionally, in the fixing structure of the room lamp 1 applied to this embodiment, the design-part-side connector insertion frame 28 provided at the design part 2 is made into a frame shape, whereby it is possible to firmly regulate displacement of the design part 2 in the disengagement direction from the functional part 3 while providing a simple shape that is easy to form.

Moreover, since the locking portion 28a of the design-part-side connector insertion frame 28 serves as the locking portion that is lockable to the engaging claw 71 provided on the top face of the connector 7, the structure of the connector portion 36 provided at the functional part 3 can be simplified.

In addition, constituent members, such as the lamp unit, the design part, the functional part, the connector portion, the connector insertion portion, the regulating portion, the connector, and the engaging lock portion according to the fixing structure of the indoor lamp of the invention, are not limited to the configuration of the above embodiment, and various forms can be taken on the basis of the concept of the invention.

In the above embodiment, the case where the room lamp 1 that is a lamp unit is attached to the roof trim 5 that is an interior wall member has been described. However, it is needless to say that the invention can also be applied to fixing structures of various lamp units, such as a map lamp to be attached to a roof trim and a courtesy lamp to be attached to a door trim.

In then above embodiment, the design-part-side connector insertion frame 28 with a rectangular frame shape that surrounds the peripheral portion of the connector 7 is used as the regulating portion provided in the design part 2. However, other frame shapes, such as a round shape, can also be used according to the cross-sectional shape of the connector. Additionally, for example, the regulating portion may be formed by a pair of vertical portions that rises from the top face of the frame plate portion 23 in the design part 3, and L-shaped bending portions that are provided to extend such that their distal ends face upper ends of the vertical portions, respectively.

That is, the regulating portion in the invention is a portion of the design part which forms the connector insertion portion along with the connector portion of the functional part, and various forms can be taken if a shape having sufficient rigidity which can withstand the load that acts via the connector inserted into the connector insertion portion is provided.

Additionally, in the above embodiment, the card edge type connector 7 is used as the connector to be connected to the connection pad 45 in the connector portion 36. However, other types of connectors according to the type of the connector portion can also be used.

Moreover, in order to bring the connector into a locked state at the connector insertion portion, the engaging lock portion provided at this connector may be provided not only on the top face but also on a bottom face or right and left side faces as long as the engaging lock portion is provided at an outer peripheral face of the connector. Thus, in the above embodiment, the locking portion 28a laid over the upper end of the design-part-side connector insertion frame 28 that is the regulating portion is used as the engaging portion that is lockable to the engaging claw 71 of the connector 7. However, the locking portion may be provided anywhere on the inner peripheral edge of the design-part-side connector insertion frame 28 so as to correspond to the position of the engaging lock portion provided at the connector.

Additionally, the wirings to be connected to the connector are not limited to the wire harness of the above embodiment, and flat circuit bodies, such as FPC (flexible printed circuit board) and a ribbon wire, FFC (flexible flat cable), and the like can be used.

The present application is based on Japanese Patent Application No. 2011-005051 filed on Jan. 13, 2011, the contents of which are incorporated herein by reference.

INDUSTRIAL APPLICABILITY

By a configuration of the invention, it is possible to provide a fixing structure of an indoor lamp that can improve attachment strength of a lamp unit to an interior wall member without increasing the number of parts.

REFERENCE SIGNS LIST

1: ROOM LAMP (LAMP UNIT)
2: DESIGN PART
3: FUNCTIONAL PART
4: CIRCUIT BOARD
5: ROOF TRIM (INTERIOR WALL MEMBER)
6: CABLE HARNESS (WIRING)
7: CONNECTOR
28: DESIGN-PART-SIDE CONNECTOR INSERTION FRAME (REGULATING PORTION)
28a: LOCKING PORTION
36: CONNECTOR PORTION
40: CONNECTOR INSERTION PORTION
51: LAMP ATTACHMENT HOLE
71: ENGAGING CLAW (ENGAGING LOCK PORTION)

The invention claimed is:

1. A fixing structure of an indoor lamp, comprising:
an interior wall member of a vehicle having a lamp attachment hole; and
a lamp unit attached to the lamp attachment hole;
wherein the lamp unit includes:
- a design part arranged at an indoor side of the interior wall member; and
- a functional part arranged at an outdoor side of the interior wall member, and assembled with the design part through the lamp attachment hole in a state that the functional part holds the interior wall member therebetween;

wherein the functional part has a connector portion for connecting a connector connected to a wiring;
wherein the design part has a regulating portion which forms a connector insertion portion together with the connector portion when the design part is assembled with the functional part; and
wherein the regulating portion engages with the connector inserted into the connector insertion portion to regulate displacement of the design part in a disengagement direction from the functional part.

2. The fixing structure of the indoor lamp according to claim 1, wherein the regulating portion is formed in a frame shape which surrounds an outer peripheral portion of the connector to be inserted into the connector insertion portion.

3. The fixing structure of the indoor lamp according to claim 1, wherein the regulating portion has a locking portion which is operable to lock to an engaging lock portion provided on an outer peripheral portion of the connector.

* * * * *